United States Patent [19]

Cantrell et al.

[11] Patent Number: 5,596,749

[45] Date of Patent: Jan. 21, 1997

[54] ARBITRATION REQUEST SEQUENCER

[75] Inventors: Jay T. Cantrell, Dallas; Edward R. Schurig, Plano, both of Tex.

[73] Assignee: Texas Instruments Incorporated, Dallas, Tex.

[21] Appl. No.: 948,048

[22] Filed: Sep. 21, 1992

[51] Int. Cl.⁶ .................................................. G06F 13/26
[52] U.S. Cl. .................. 395/673; 364/230.2; 364/241.2; 364/280.8; 364/281.4; 364/DIG. 1
[58] Field of Search ....................................... 395/650, 700

[56] References Cited

U.S. PATENT DOCUMENTS

| Re. 33,705 | 10/1991 | Caprio et al. | 395/325 |
|---|---|---|---|
| 4,851,990 | 7/1989 | Johnson et al. | 395/325 |
| 5,119,480 | 6/1992 | Garcia | 395/325 |
| 5,182,800 | 1/1993 | Farrell et al. | 395/425 |
| 5,193,193 | 3/1993 | Iyer | 395/725 |
| 5,195,185 | 3/1993 | Marenin | 395/325 |
| 5,247,684 | 9/1993 | Tavares et al. | 395/700 |
| 5,293,493 | 3/1994 | Smith et al. | 395/325 |
| 5,307,487 | 4/1994 | Tavares et al. | 395/650 |
| 5,371,849 | 12/1994 | Peaslee et al. | 395/700 |

*Primary Examiner*—Kevin A. Kriess
*Assistant Examiner*—John Q. Chavis
*Attorney, Agent, or Firm*—Thomas G. Eschweiler; James C. Kesterson; Richard L. Donaldson

[57] ABSTRACT

A method of improving efficiency in computer systems through a novel arbitration scheme is disclosed. The arbitration scheme includes a bus arbiter circuit that transparently operates in both central arbitration and distributed arbitration computer systems. The bus arbiter circuit includes an arbitration request sequencer, an arbitration competition protocol sequencer, a multiplexer, a latch, two comparators, and a series of control status registers that together provide increased system efficiency by effectively self-preempting competition priorities on its own board, thus allowing tasks with the highest priorities to compete for mastership of the bus and eliminating priority inversions.

14 Claims, 5 Drawing Sheets

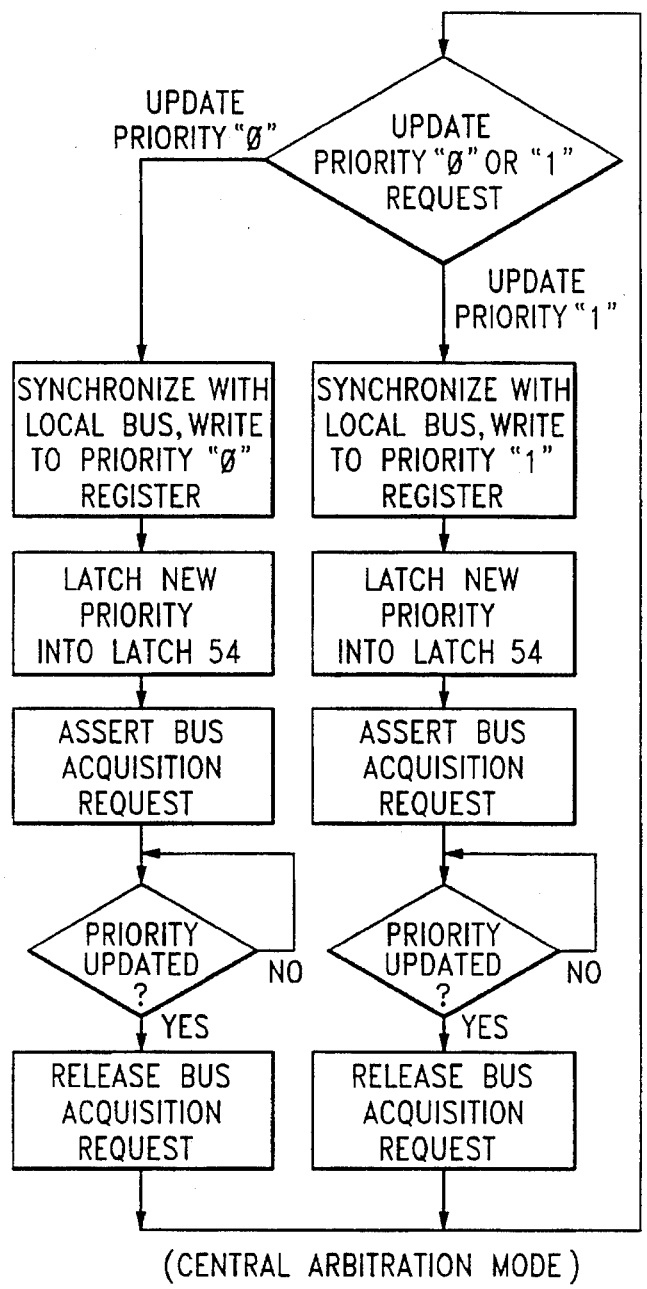
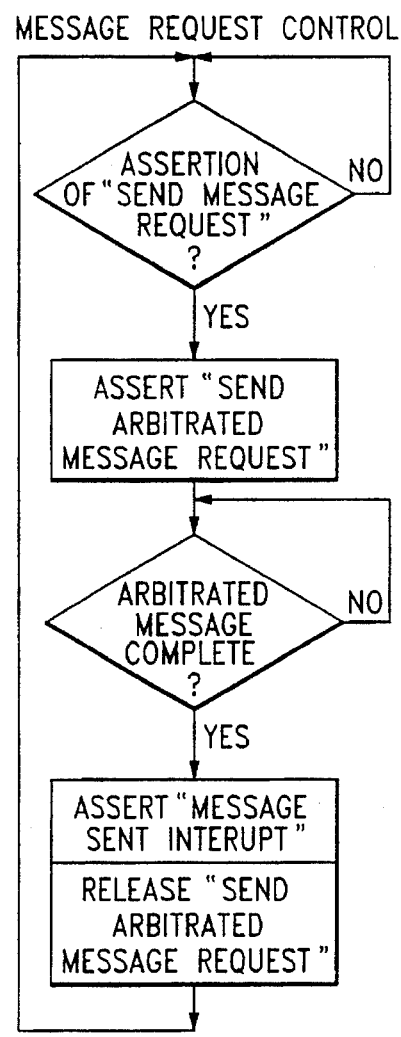
Fig. 7 (CENTRAL ARBITRATION MODE)
Fig. 8

ARBITRATION REQUEST SEQUENCER

FIELD OF THE INVENTION

This invention is in the field of electronic circuits and is more particularly related to computers and bus arbitration.

BACKGROUND OF THE INVENTION

In many computer system environments each component associated with the computer system shares a bus or a plurality of buses with other system components. Computer components may include individual computer boards created to provide functions such as an enhanced graphics board, a memory board, or an audio board. Often, several boards wish to utilize a bus simultaneously; thus various arbitration methods for determining which component has the highest priority bus acquisition request have been developed.

Computer systems typically incorporate either a central arbitration scheme or a distributed arbitration scheme. A central arbitration scheme utilizes a single, central arbitration device for the entire computer system. Thus, each system component sends its bus acquisition request to the central arbitration device which determines the appropriate priority. A distributed arbitration scheme, however, incorporates arbitration devices on each computer system component. Thus, in a distributed arbitration scheme, each component prioritizes the bus acquisition requests of the various devices on its own component board.

Regardless of the arbitration method, central or distributed, sequencing various bus acquisition requests is a challenging endeavor. Prior art arbitration methodologies have weaknesses because under certain circumstances high priority tasks must wait while low priority tasks compete for mastership of the bus. This problem is called a priority inversion and may result in important tasks not meeting their deadlines.

It is an object of this invention to provide a method of request sequencing which provides self-preemption on its own component board to eliminate priority inversions and therefore improve system performance. Other objects and advantages of the invention will become apparent to those of ordinary skill in the art having reference to the following specification together with the drawings herein.

SUMMARY

An arbitration scheme for improving efficiency in computer systems uses a bus arbiter circuit-that transparently operates in both central arbitration and distributed arbitration computer systems. The bus arbiter circuit may include an arbitration request sequencer, an arbitration competition protocol sequencer, a multiplexer, a latch, two comparators, and a series of control status registers all on a single board. The bus arbiter circuit increases system efficiency by effectively self-preempting competition priorities on its own board, thus allowing tasks with the highest priorities to compete for mastership of the bus and thereby eliminates priority inversions.

BRIEF DESCRIPTION OF THE DRAWINGS

FIG. 7 is a flow chart diagram illustrating the operation of the first state machine located within the arbitration request sequencer operating within a central mode computer system.

FIG. 8 is a flow chart diagram illustrating the operation of a second state machine located within the arbitration request sequencer.

DETAILED DESCRIPTION OF THE PREFERRED EMBODIMENT

Figure 1:
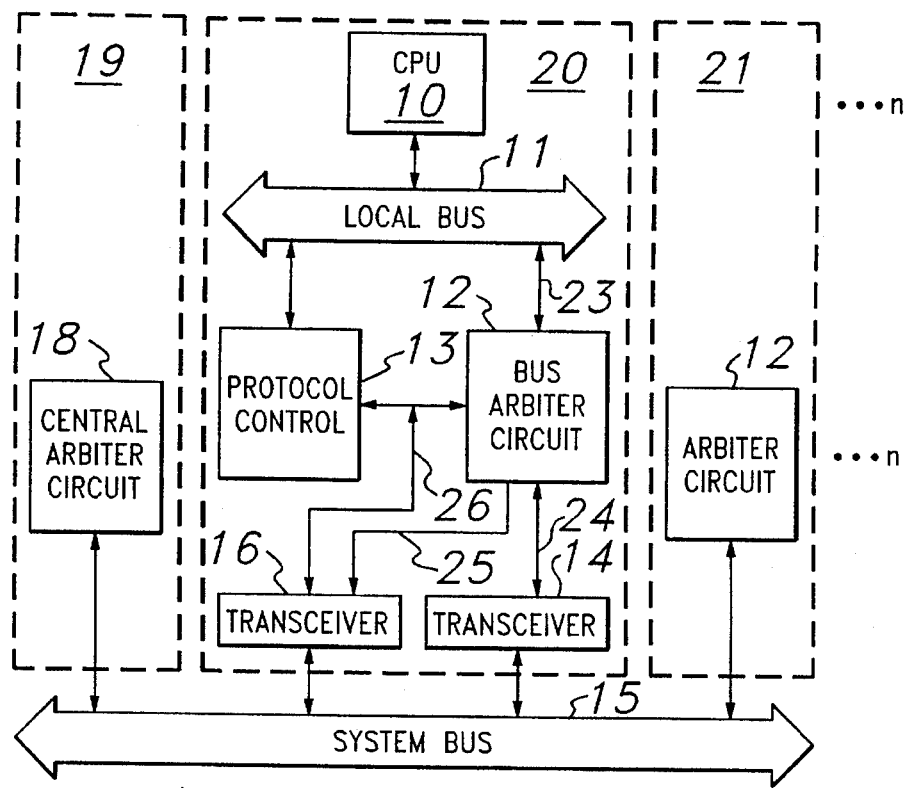
FIG. 1 is a system level block diagram illustrating a plurality of boards connected to a system bus in a standard backplane environment.

FIG. 1 is a block level diagram illustrating a computer system 22 within which the preferred embodiment of the invention operates. The computer system 22 includes a plurality of system modules 19, 20, and 21 connected to a system bus 15. System module 20 may contain a CPU 10 coupled to local bus 11. A protocol controller 13 and a bus arbiter circuit 12 are coupled to the local bus 11 and to each other. Protocol controller 13 and bus arbiter circuit 12 are also coupled to transceivers 14 and 16. Transceivers 14 and 16 are coupled to system bus 15.

System bus, 15, is preferably a Futurebus+. Futurebus+ is an IEEE specification for high-performance backplane-based computing that permits architectural consistency across a broad range of computer products. Key attributes of Futurebus+ are discussed in the article of J. Theus in *Microprocessor Report*, Volume 6, Number 7, May 27, 1992. Futurebus+is a comprehensive architectural specification designed as an open standard; that is, an interface standard for which there are no preconceived restrictions in terms of architecture, microprocessor, and software implementations.

The system modules 19, 20, and 21 may have a plurality of memory chips, CPUs, and/or peripheral (I/O) chips on them. The plurality of memory chips, CPUs, and I/O chips are able to communicate with one another via system bus 15. System module 20 may be a high-end computer board, performing a function such as, for example, regulating a flow system for the Space Shuttle.

CPU 10, for example, may comprise an Intel 486, or a Motorola 68040 microprocessor, while local bus 11, may comprise the buses that service a variety of microprocessors such as R4000, 680X0, 88XXX and 80X86 microprocessors. Transceivers 14 and 16 may comprise a SN74FB2031, SN74FB2032, or SN74FB2040, all manufactured by Texas Instruments Inc. Protocol control 13 may comprise common electrical components which together perform the function of autonomous control, and host module reads and writes for system bus 15 known to those skilled in the art of system design. Bus arbiter circuit 12 is an element that provides a significantly improved arbitration methodology and will be discussed in detail later.

Figure 2:
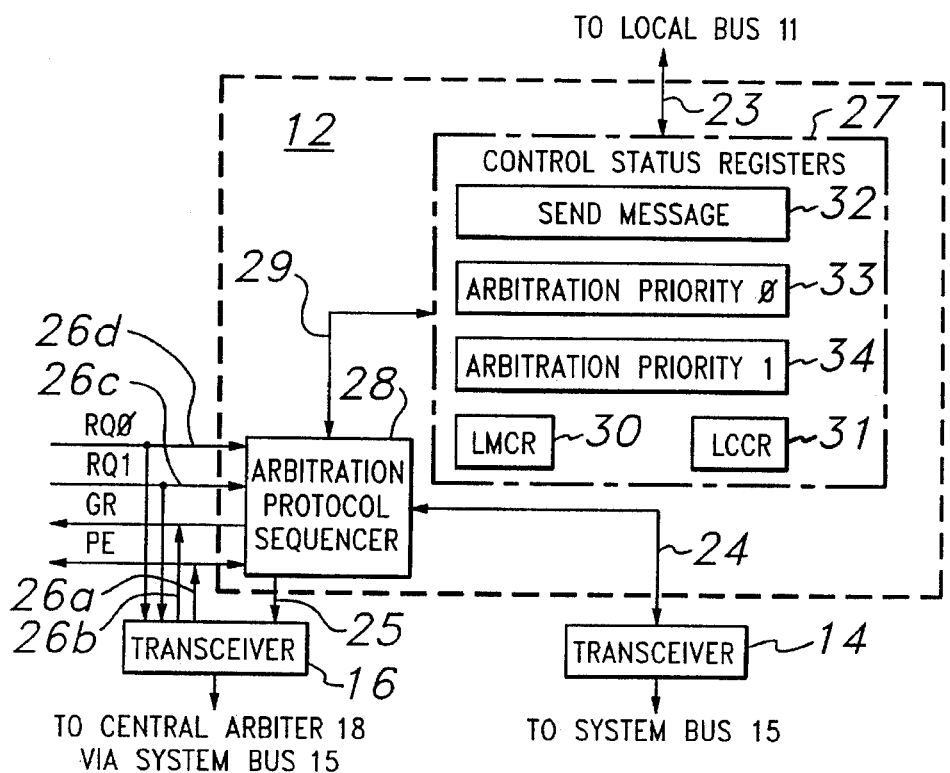
FIG. 2 is a block level diagram illustrating the internal components of a bus arbiter circuit.

FIG. 2 is a block diagram illustrating various components within bus arbiter circuit 12. Bus arbiter circuit 12 comprises a control status register 27 (comprising of a plurality of individual registers 30–34) which is bidirectionally coupled to local bus 11 via line 23. An arbitration protocol sequencer 28 is bidirectionally coupled to register 27 via line 29. Arbitration protocol sequencer 28 is also bidirectionally coupled to protocol control 13 and system bus 15 via lines 26a–d, to transceiver 14 via line 24, and to transceiver 16 via line 25 and lines 26a–d.

Line 24 is a main arbitration interface, performing the handshake between the bus arbiter 12 and system bus 15. Line 24 is used in both central and distributed mode to send messages to other bus agents, acquire the bus ownership in distributed mode, or to send priority updates to the central arbiter in central mode.

Line 23 provides register access, allowing the values in registers 27 to be loaded and observed. Within control status registers 27, logical module control register (LMCR) 30 indicates whether or not system module 20 is master enabled. This information is important when the system is operating in distributed mode. Logical common control register (LCCR) 31 contains information indicating whether the system is operating in central mode or in distributed mode.

Send message register 32 contains an 8-bit arbitration message. When this register is written, an arbitration message is sent. "Arbitration priority register 0" 33 contains an 8-bit priority field used when RQ0 (line 26d) is asserted. In distributed mode, this number is used to determine an arbitration number. In central mode, this number is used to automatically program central arbiter circuit 18 (in FIG. 1) via an arbitrated message. "Arbitration priority 1" register 34 contains an 8-bit priority field used when RQ1 (line 26c) is asserted. In distributed mode, this number is used to determine an arbitration number. In central mode, this number is used to automatically program central arbiter circuit 18 (in FIG. 1) via an arbitrated message.

Still referring to FIG. 2, signal 26a (PE) is a preempt signal which is driven high to indicate that a module with a higher priority has become the master-elect when the system is in distributed mode. This signal remains in the high impedance state while the system is in the central mode. Signal 26b (GR) is the grant signal used by bus arbiter 12 when the system is in distributed mode to indicate that system bus mastership has been granted. This signal remains in the high impedance state when the system is in central mode. Signals 26a and 26b (RQ0 and RQ1) are signal lines used by protocol control 13 to request system bus access.

Figure 3:
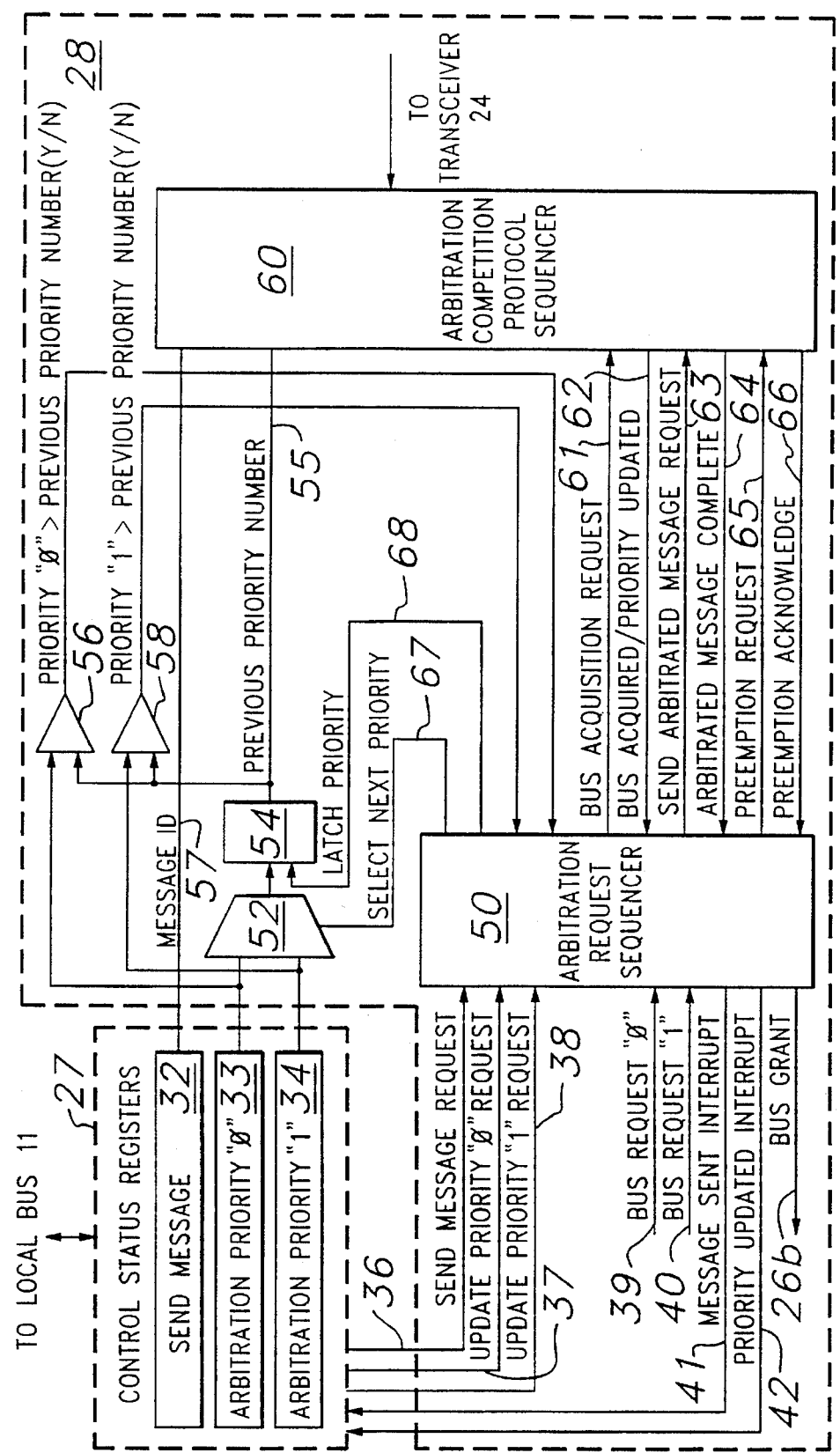
FIG. 3 is a block level diagram illustrating the preferred embodiment of the invention, namely an arbitration protocol sequencer.

FIG. 3 is a block diagram illustrating in greater detail control status registers 27 with arbitration protocol sequencer 28. Arbitration protocol sequencer 28 has an arbitration request sequencer 50 connected to a multiplexer 52, a latch 54, two comparators 56 and 58, and an arbitration competition protocol sequencer 60. Arbitration competition protocol sequencer 60 is also connected to latch 54 and to send message register 32. Send message register 32, arbitration priority "0" register 33, and arbitration priority "1" register 34 interact with three state machines within arbitration request sequencer 50, multiplexer 52, latch 54, comparators 56 and 58, and arbitration competition protocol sequencer 60 to provide a novel self-preemption feature by comparing new bus requests 39 and 40 with a previous priority 55 that competes for mastership of system bus 15. System performance is advantageously improved by eliminating priority inversions. Arbitration request sequencer 50 includes a plurality of state machines that may be implemented via sequential circuitry using standard sequential circuit design. Arbitration protocol sequencer 60 also includes a state machine which may be implemented with standard sequential circuit design. Sequential circuit design, both synchronous and asynchronous, is well understood and known by those skilled in the art as shown by the following references: *Asynchronous Sequential Switching Circuits*, by Stephen H. Unger, R. E. Krieger Publishing Co., 1969 and *An Engineering Approach to Digital Design*, by William I. Fletcher, Prentice-Hall, Inc., 1980.

Following is a detailed functional description of the preferred embodiment of the invention. FIG. 3 illustrates the preferred embodiment of the invention, namely the self-preemption feature that allows a new priority to compete for mastership of system bus 15 by comparing with previous priority line 55 and allowing the higher priority bus request to be asserted. This may take place each time a new, higher priority bus request 39 and 40 is asserted, each time a higher priority arbitration priority register 33 and 34 is updated, or each time a message needs to be sent. Therefore, arbitration request sequencer 50 is able to compete for system bus 15 with the highest priority request at all times, thus eliminating priority inversions.

Figure 4:
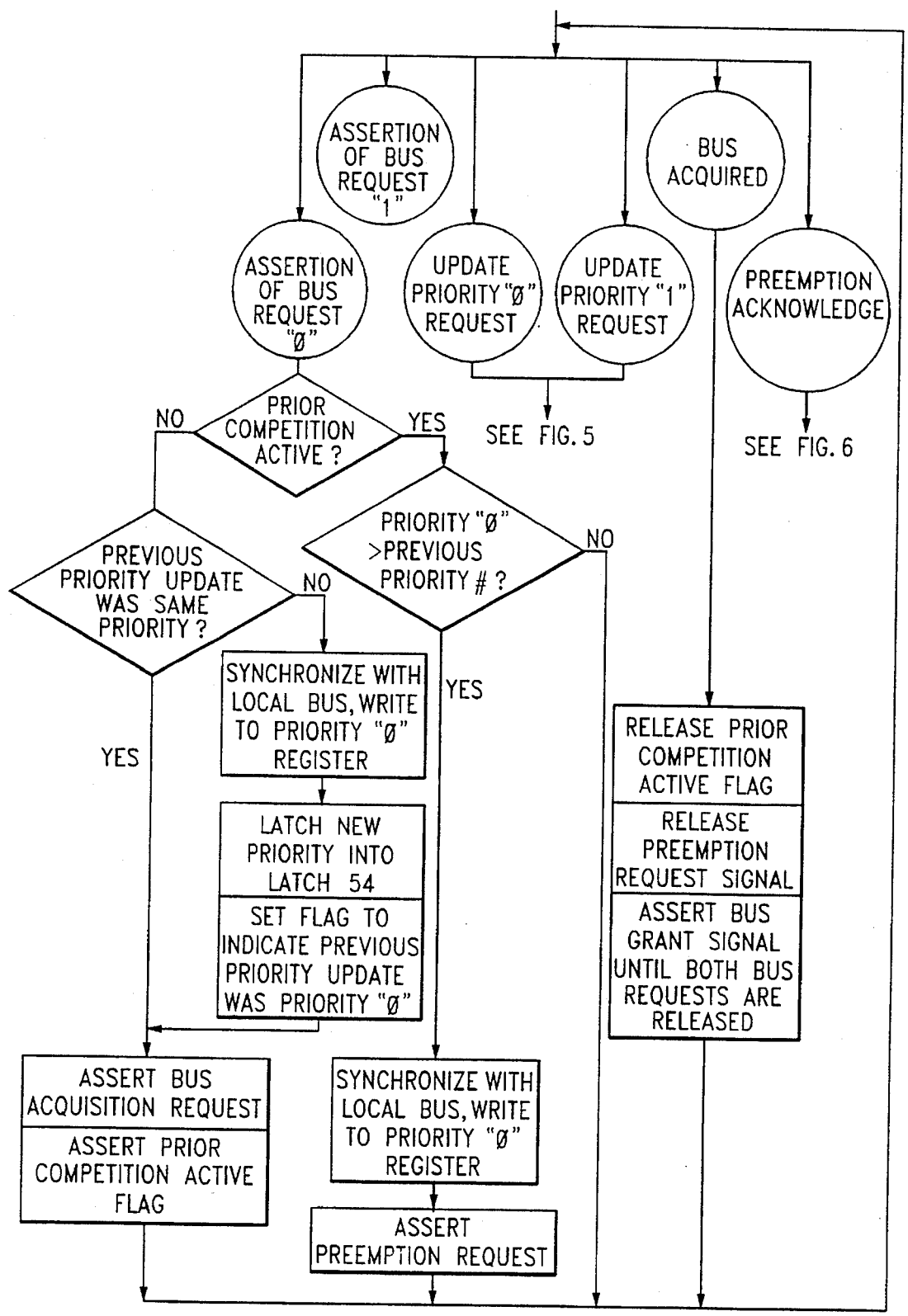
FIG. 4 is a flow chart diagram illustrating the operation of a first state machine located within the arbitration request sequencer operating within a distributed mode computer system.

FIG. 4 illustrates how arbitration protocol sequencer 28 performs the appropriate request sequencing. Arbitration request sequencer 50 comprises three state machines that each have a plurality of inputs and outputs. The operation of the first state machine is illustrated in FIG. 4. There are six initial options that represent input signals to arbitration request sequencer 50: assertion of bus request "0" 39, assertion of bus request "1" 40, update of priority "0" request 37, update of priority "1" request 38, bus acquired signal 62, and preemption acknowledge signal 66. Each request has a series of operations that correspond to each particular input. FIG. 4 illustrates specifically the operations associated with assertion of bus request "0" and "1", 39 and 40, and bus acquired signal 62.

When the assertion of bus request "0" 39 occurs it indicates that protocol control circuit 13 of FIG. 1 has initiated a bus request in response to a request from CPU 10 via local bus 11. In response, arbitration request sequencer 50 checks an internal flag called a prior competition active flag to see if it is active. The prior competition active flag is active when arbitration competition protocol sequencer 60 is actively competing for mastership of system bus 15. When not actively competing for mastership of system bus 15 the prior competition active flag is inactive. In the event that prior competition flag is inactive request sequencer 50 checks to see what arbitration priority was selected in multiplexer 52 via a select next priority line 67 shown in FIG. 3. If the arbitration priority most recently used was arbitration priority "0" 37 then the previous priority update was the same priority and request sequencer 50 asserts bus acquisition request signal 61 to arbitration competition protocol sequencer 60. Request sequencer 50 then enables latch 54 via latch priority signal 68 such that the priority number in arbitration priority "0" register 33 is latched onto the output of latch 54. This becomes an input to arbitration competition protocol sequencer 60 which in turn uses the priority value to compete for mastership of system bus 15. While bus acquisition request signal 61 is being asserted, the prior competition flag is made active so that as future bus acquisition requests 39 and 40 are made, request sequencer 50 will know that arbitration competition protocol sequencer 60 is presently competing for system bus 15 with the priority value in arbitration priority "0" register 33.

In the event that the previous priority update was not the same priority (multiplexer 52 had last selected the value in arbitration priority "1" register 34) request sequencer 50 must indicate to multiplexer 52 to select arbitration priority "0" register 33. Arbitration priority "0" register 33 undergoes a synchronization which is not described here, but is well known by those skilled in the art of digital circuit design. The synchronization process ensures that a stable value exists in register 33. After synchronization request sequencer 50 enables latch 54 via latch priority signal 68, thus latching the value in arbitration priority "0" register 33 onto the output of latch 54. Simultaneously with the latching of a new priority value, request sequencer 50 sets a flag to indicate that the previous priority update was a priority "0". Request sequencer 50 then asserts bus acquisition request signal 61 to arbitration competition protocol sequencer 60 so that the new priority value on the output of latch 54 will be used to compete for system bus 15. Request sequencer 50, simultaneously with the assertion of bus acquisition request signal 61, makes the prior competition active flag so that request sequencer 50 knows that arbitration competition protocol sequencer 60 is presently competing for system bus 15.

In the event that bus request "0" 39 is asserted and the prior competition active flag is active a different set of operations take place. An active prior competition flag in request sequencer 50 means that arbitration competition protocol sequencer 60 is presently competing for system bus 15 with previous priority number 55 (the output of latch 54). The value within arbitration priority "0" register 33 is compared via comparator 56 with previous priority number 55. If the value within register 33 is not greater than previous priority number 55 then it is not a higher priority request and no changes are made. If the value within register 33 is greater than previous priority number 55 then the value in register 33 is synchronized and request sequencer 50 asserts a preemption request signal 65 to arbitration competition protocol sequencer 60. This indicates to arbitration competition protocol sequencer 60 that a task with a higher priority wants to preempt the present task that is competing for system bus 15. Arbitration competition protocol sequencer 60 then sends back a preemption acknowledge signal 66 to request sequencer 50 indicating to go ahead and preempt the present task competing for system bus 15. Request sequencer 50 tells multiplexer 52 via select next priority signal 67 to select register 33 for input to latch 54. Request sequencer 50 also enables latch 54 via latch priority signal 68 so that the value within arbitration priority "0" register 33 is latched onto the output of latch 54 so that arbitration competition protocol sequencer 60 will use this new task's priority to compete for system bus 15.

The description of the operation of request sequencer 50 when asserting bus request "1" 40 mirrors the description above for asserting bus request "0" 39. Simply replacing "1" for "0" and arbitration priority "1" register 34 for arbitration priority "0" register 33 will accurately describe the operation of request sequencer 50 when asserting bus request "1" 40.

FIG. 4 also illustrates the operation of arbitration protocol sequencer 28 and more specifically request sequencer 50 when the task priority competing for system bus 15 wins mastership of system bus 15. Because arbitration competition protocol sequencer 60 was competing for system bus 15 it is obvious that the prior competition active flag in request sequencer 50 was active. Therefore, arbitration competition protocol sequencer 60 asserts bus acquired signal 62. In response, request sequencer 50 simultaneously releases the prior competition active flag, the preemption request signal 65 if any preemption had been occurring, and asserts a bus grant signal 26b which communicates to protocol control 13 (in FIG. 2) that arbitration protocol sequencer 28 has mastership of system bus 15. Bus grant signal 26b remains asserted until bus request "0" 39 or "1" 40 is released.

Figures 5, 6:
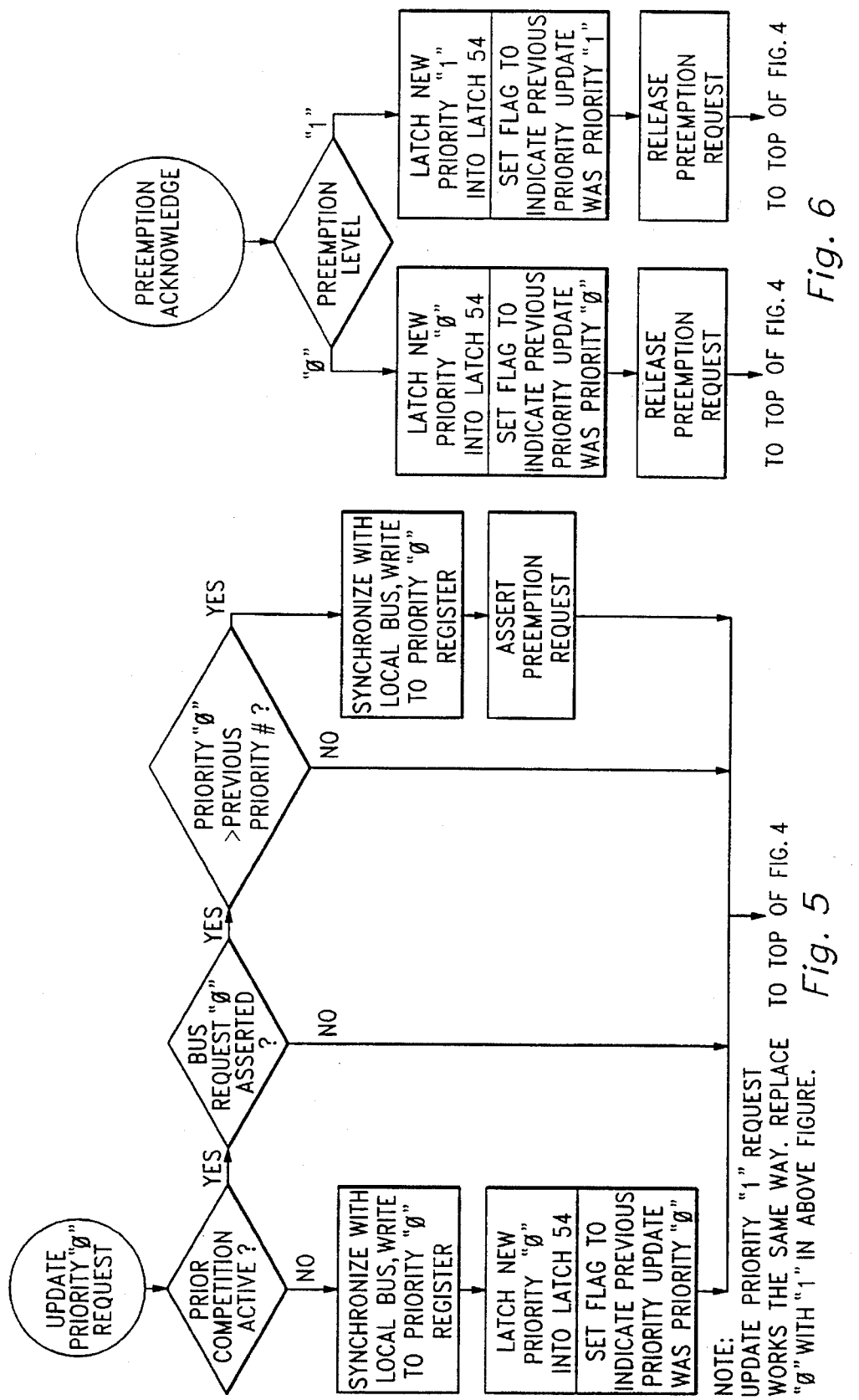
FIG. 5 is a flow chart diagram illustrating the continued operation of the first state machine operating within a distributed mode computer system.
FIG. 6 is a flow chart diagram illustrating further the continued operation of the first state machine located within the arbitration request sequencer.

Note in FIG. 4 that only three of six of the possibilities are shown explicitly. FIG. 5 illustrates the operation of request sequencer 50 when either register 33 or register 34 is updated with a new priority value when operating in a distributed arbitration system. This may occur when a task has been waiting for system bus 15 for a long time. After waiting for a period of time, the priority of the task may be increased because the need for the task has become more urgent. In the event that the priority value in arbitration priority "0" register 33 is updated the following occurs: CSR 27 sends an update priority "0" request 37 to request sequencer 50. Request sequencer 50, in response, looks to see the status of the prior competition active flag. If it is not active, ,5 register 33 is synchronized, request sequencer communicates to multiplexer to select the arbitration priority "0" register 33 signal via select next priority signal 68, and the updated priority value is latched onto the output of latch 54. Simultaneously with the latching of the updated priority on latch 54 request sequencer 50 sets a flag to indicate that the previous priority update was priority "0". Arbitration competition protocol sequencer 60 may then compete for system bus 15.

If, when the priority value within arbitration priority "0" register 33 is updated (asserting update priority "0" request signal 37), the prior competition active flag is active. This indicates that arbitration competition protocol sequencer 60 is actively competing for mastership of system bus 15. Request sequencer 50 looks at select next priority signal 67 to determine whether bus request "0" 39 was asserted. If bus request "0" signal 39 was not asserted then CPU 10 of FIG. 1 has not dictated a new task and no action is required of request sequencer 50. If bus request "0" signal 39 was asserted then CPU 10 of FIG. 1 has dictated that a new task must be performed. In this case the updated priority value in register 33 is compared against previous priority number 55 via comparator 56. If the present priority competing for system bus 15 is greater than the updated priority then no changes occur and previous priority number 55 continues competing for system bus 15. If the updated priority value in register 33 is greater than previous priority number 55 then the updated priority value is synchronized and request sequencer 50 asserts preemption request signal 65 to arbitration competition protocol sequencer 60. Upon reception of preemption acknowledge signal 66 from arbitration competition protocol sequencer 60, request sequencer 50 indicates to multiplexer 52 via select next priority signal 67 to select the value in register 33 to the input of latch 54. Request sequencer also enables latch 54 via latch priority signal 68 thereby latching the updated priority value in register 33 onto the output of latch 54. Arbitration competition protocol sequencer 60 then uses the new updated priority to compete for mastership of system bus 15. In this example it is easily seen how request sequencer 50 self-preempts so that the board always is competing with the highest priority tasks and thereby eliminating priority inversions.

FIG. 6 explicitly illustrates the operation of request sequencer 50 when arbitration competition protocol sequencer 60 asserts preemption acknowledge signal 66. In each case of self-preemption described in FIG. 4 and FIG. 5 the behavior of request sequencer 50 when preemption acknowledge signal 66 was asserted was described. This again formally explains the sequence of events that occur following the assertion of preemption acknowledge signal 66. When operating in distributed mode, when arbitration competition protocol sequencer 60 asserts preemption acknowledge signal 66, request sequencer 50 initially looks to see if the preemption level was for arbitration priority "0" 33 or arbitration priority "1" 34. This is determined from the output of either comparator 56 or 58 indicating that a new priority value is greater than previous priority number 55. Depending upon whether level "0" or level "1" priority was requested, request sequencer 50 latches the appropriate new priority into latch 54 via select next priority signal 67 and latch priority signal 68. Simultaneously with latching the new priority, request sequencer 50 sets a flag indicating whether the last priority update was a priority level "0" update or a priority level "1" update. Request sequencer 50 then releases preemption request signal 65.

FIG. 7 is a flow chart diagram illustrating the operation of the first state machine located within arbitration request sequencer 50 operating within a central mode arbitration computer system. FIG. 4 and FIG. 5 illustrated the first state machine in distributed mode, FIG. 7 illustrates the first state machine in central mode. In a central mode arbitration scheme all bus requests are made to central arbiter circuit 18. Therefore, bus requests 39 and 40 described in FIG. 4 are no longer options. Additionally, bus acquired signal 62 from arbitration competition protocol sequencer 60 and preemption acknowledge signal 66 are no longer utilized. Only priority updates are made to request sequencer 50. When a priority update is made there are two options: either update priority "0" request signal 37 or update priority "1" request signal 38 is asserted. Both cases are illustrated in FIG. 7, yet only one case will be discussed. If update priority "0" request signal 37 is asserted then register 33 is synchronized to ensure a stable value. Request sequencer indicates to multiplexer 52 via select next priority signal 67 to place the updated priority value in register 33 onto the output of latch 54. Request sequencer also enables latch 54 via latch priority signal 68. Therefore the updated priority value within register 33 is latched onto the output of latch 54. Request sequencer 50 asserts bus acquisition request signal 61 to arbitration competition protocol sequencer 60 and waits until the updated priority has been sent to central arbiter circuit 18. After the priority value has been updated in central arbiter circuit 18 arbitration competition protocol sequencer 60 asserts priority updated signal 62 which results in request sequencer 50 releasing bus acquisition request signal 61.

FIG. 8 is a flow chart diagram illustrating the operation of a second state machine located within arbitration request sequencer 50. This second state machine performs the operation of message request control for request sequencer 50 and operates in the same way regardless of whether a distributed arbitration scheme or a central arbitration scheme is being used. A typical message sent from CPU 10 to other boards may be a power failure message. The second state machine utilizes a send message request input 36 an arbitrated message complete input 64, a message sent interrupt output 41, and a send arbitrated message request output 63. When CPU 10 of FIG. 1 dictates a message request via local bus 11 to CSR registers 27, a send message request 36 is sent to request sequencer 50. In response, request sequencer 50 asserts send arbitrated message request signal 63 to arbitration competition protocol sequencer 60. Arbitration competition protocol sequencer 60, in response to signal 63 takes the message within send message register 32 via message ID line 57 and performs the arbitration protocol to send the message. Note that message ID line 57 is separate from previous priority number bus 55. This is because messages coming to arbitration competition protocol sequencer 60 automatically take a higher priority than any standard bus acquisition request (39 and 40). After the message within send message register 32 has been sent along system bus 15 arbitration competition protocol sequencer 60 asserts arbitrated message complete signal 63. Request sequencer 50, in response to the assertion of arbitrated message complete signal 63, asserts message sent interrupt signal 41 while simultaneously releasing send arbitrated message request signal 63. Send message register 32 is now once again ready to receive new message information from CPU 10 via local bus 11.

Although the invention has been described with reference to the preferred embodiment herein, this description is not to be construed in a limiting sense. Various modifications of the disclosed embodiment will become apparent to persons skilled in the art upon reference to the description of the invention. It is therefore contemplated that the appended claims will cover any such modifications or embodiments as fall within the true scope of the invention.

What is claimed is:

1. A method of preventing priority inversions in a distributed mode arbitration system through self-preemption of a request competing for mastership of a bus on its own computer card, comprising the steps of:

determining whether a new task on a computer card having a priority value is greater in importance than the priority value of the task on the same computer card presently competing for mastership of the bus, wherein the presence of a new task is indicated by the sending of a message having a priority value to a send message register on the computer card; and replacing the task presently competing for mastership of the bus with the new task if the new task possesses a greater priority value.

2. The method of claim 1 wherein the presence of a new task is indicated by the assertion of a bus request on the computer card.

3. The method of claim 1 wherein the presence of a new task is indicated by the updating of the priority of the task presently competing for mastership of the bus.

4. The method of claim 1 wherein the step of determining whether a new task has greater priority comprises the steps of:

asserting a bus request having a priority value to a request sequencer circuit; and comparing the priority value of the bus request with a previous priority value of a previous bus request wherein the previous priority bus request was competing for mastership of a system bus.

5. The method of claim 4 wherein asserting a bus request having a priority value to a request sequencer circuit, comprises the steps of:

requesting the system bus for a task;

assigning a priority value to the task; and checking whether other tasks with assigned priorities are competing for mastership of the system bus.

6. A method of self-preemption on a single computer card operating in a backplane environment in a distributed mode computer system, comprising the steps of:

asserting a preemption request signal from a request sequencer circuit to an arbitration competition circuit that is competing for mastership of a system bus with a priority value associated with a task from the computer card that is less than the priority value of a new task on the same computer card;

replacing the priority value of the lower priority task presently competing for mastership of the system bus with the higher task priority value wherein the single computer card has preempted itself;

asserting a pre-emption acknowledge signal from the arbitration competition circuit to the request sequencer circuit; and releasing the preemption request signal to the arbitration competition circuit.

7. The method of claim 6 wherein the replacement of the task with a lower priority value with the new task priority value comprises the steps of:

removing the lower priority task value from competing for mastership of the system bus; and latching the new, higher task priority value into the arbitration competition circuit which competes for mastership of the system bus.

8. The method of claim 7 wherein the new task having a new task priority value is a message.

9. A method of updating priority requests on a single computer card operating within a backplane environment in a distributed mode arbitration computer system, comprising the steps of:

asserting an update priority request signal having a priority value to a request sequencer circuit;

evaluating an arbitration competition circuit status to determine whether a task is presently competing for mastership of a system bus;

latching a task priority value into the arbitration competition circuit if no task is presently competing for mastership of the system bus;

checking whether a bus acquisition request signal has been asserted from the request sequencer circuit to the arbitration competition circuit if a task is presently competing for mastership of the system bus;

determining whether the priority value of the bus acquisition request is greater than the updated priority value if a task is presently competing for mastership of the system bus; and asserting a preemption request signal from the request sequencer circuit to the arbitration competition circuit if the updated priority value is greater than the priority value associated with the bus acquisition request such that a single computer card self-preempts when a task having an updated priority value becomes greater in importance than the task presently competing for mastership of the system bus.

10. A method of self-preempting a task with a priority value competing for mastership of a bus with a message request having a priority value greater than the task on a single computer card, comprising the steps of:

asserting a send message request signal to an arbitration request sequencer;

sending a send arbitrated message request signal from the arbitration request sequencer to an arbitration competition protocol sequencer; and preempting a task that initially had bus priority through the arbitration competition protocol sequencer.

11. An arbitration protocol sequencer that transparently operates in either distributed mode or central mode arbitration schemes in a backplane environment computer system and provides self-preemption on a single computer card, comprising:

an arbitration request sequencer circuit;

an arbitration competition protocol sequencer circuit connected to the arbitration request sequencer; and a multiplexer connected to the arbitration request sequencer;

a latch connected to the multiplexer, the arbitration request sequencer, and the arbitration competition protocol sequencer; and two comparators connected to the multiplexer, the latch, and the arbitration request sequencer;

wherein the arbitration request sequencer circuit compares via the two comparators and the multiplexer a priority value of a new bus request to a priority value of a bus request presently competing for mastership of a system bus, and when the new bus request priority value is greater than the priority value of the bus request competing for mastership of the system bus the latch latches the new bus request priority value to the arbitration competition protocol sequencer circuit such that the computer card preempts itself and competes for mastership of the system bus with the new priority value of the new bus request.

12. The arbitration protocol sequencer of claim 11 wherein the arbitration request sequencer and arbitration competition protocol sequencer comprise state machines implemented with asynchronous sequential circuits.

13. The arbitration protocol sequencer of claim 11 wherein the arbitration request sequencer and arbitration competition protocol sequencer comprise state machines implemented with synchronous sequential circuits.

14. The method of claim 1 wherein the step of replacing the task presently competing for mastership of the bus with the new task having greater priority comprises:

asserting a preemption request to an arbitration competition circuit when the priority value of the bus request is greater than the priority value of the previous bus request wherein the assertion of the preemption request causes the priority value of the previous bus request to replace the priority value of the previous bus request and compete for mastership of the system bus via the arbitration competition circuit, thus allowing the bus request with the highest priority to compete for mastership of the system bus.

\* \* \* \* \*